(12) United States Patent
Kremer et al.

(10) Patent No.: US 9,464,571 B2
(45) Date of Patent: Oct. 11, 2016

(54) FOSSIL FUEL-FIRED POWER STATION HAVING A REMOVAL APPARATUS FOR CARBON DIOXIDE AND PROCESS FOR SEPARATING CARBON DIOXIDE FROM AN OFFGAS FROM A FOSSIL FUEL-FIRED POWER STATION

(75) Inventors: Hermann Kremer, Liederbach (DE); Nicolas Vortmeyer, Erlangen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 715 days.

(21) Appl. No.: 13/820,152

(22) PCT Filed: Aug. 24, 2011

(86) PCT No.: PCT/EP2011/064562
§ 371 (c)(1),
(2), (4) Date: Mar. 1, 2013

(87) PCT Pub. No.: WO2012/028516
PCT Pub. Date: Mar. 8, 2012

(65) Prior Publication Data
US 2013/0152596 A1 Jun. 20, 2013

(30) Foreign Application Priority Data

Sep. 3, 2010 (EP) .................................... 10175226

(51) Int. Cl.
*F02C 1/05* (2006.01)
*B01D 53/14* (2006.01)
*B01D 53/62* (2006.01)

(52) U.S. Cl.
CPC ............. *F02C 1/05* (2013.01); *B01D 53/1425* (2013.01); *B01D 53/1475* (2013.01);
(Continued)

(58) Field of Classification Search
CPC ..... F02C 1/05; B01D 53/62; B01D 53/1425; B01D 2258/0283; B01D 2259/65; Y02C 10/04; Y02C 10/06

USPC ................................................ 60/772, 641.8
See application file for complete search history.

(56) References Cited

U.S. PATENT DOCUMENTS

| | | | | |
|---|---|---|---|---|
| 5,520,894 A | * | 5/1996 | Heesink ................. | B01D 53/12 423/220 |
| 6,655,150 B1 | * | 12/2003 | Ansen et al. ...... | B01D 53/1475 60/39.5 |

(Continued)

FOREIGN PATENT DOCUMENTS

| | | | | |
|---|---|---|---|---|
| AU | WO 2007012143 A1 | * | 2/2007 | ......... B01D 53/1425 |
| CN | 101818970 A | | 9/2010 | |

(Continued)

OTHER PUBLICATIONS

Naito H et al: "CO2 recovery from alkanol-amine solution using integrated stationary evacuated concentrators", Journal OE Physique IV, Editions OE Physique. Les Ulis Cedex, FR, A Bd. 9, Nr. 3, Jan. 1, 1999, Seiten PR3-349, XP008121694, I SSN: 1155-4339 Zusammenfassung Seite 352, Absätze 1,2 Seite 349, Absatz 1-3 Abbildung 1; Book; 1999; FR.

(Continued)

*Primary Examiner* — Nicholas J Weiss
*Assistant Examiner* — Jason T Newton

(57) ABSTRACT

A fossil fuel-fired power station having a removal apparatus for carbon dioxide which is located downstream of a combustion facility and through which an offgas containing carbon dioxide may flow is provided. The removal apparatus comprises an absorption unit and a desorption unit. The desorption unit is connected to a renewable energy source.

8 Claims, 1 Drawing Sheet

(52) U.S. Cl.
CPC ...... *B01D 53/62* (2013.01); *B01D 2258/0283* (2013.01); *B01D 2259/65* (2013.01); *Y02C 10/04* (2013.01); *Y02C 10/06* (2013.01)

(56) References Cited

U.S. PATENT DOCUMENTS

| | | | | |
|---|---|---|---|---|
| 7,347,049 | B2* | 3/2008 | Rajendran | F01K 25/065 60/649 |
| 7,605,293 | B2* | 10/2009 | Olah | C07C 1/20 518/726 |
| 2008/0289495 | A1* | 11/2008 | Eisenberger | B01D 53/1475 95/107 |
| 2010/0005966 | A1* | 1/2010 | Wibberley | B01D 53/1425 95/179 |
| 2011/0296872 | A1* | 12/2011 | Eisenberger | B01D 53/04 62/640 |
| 2012/0192564 | A1* | 8/2012 | Mishima | B01D 53/1425 60/676 |
| 2014/0004016 | A1* | 1/2014 | Eisenberger | B01D 53/1475 422/198 |

FOREIGN PATENT DOCUMENTS

| | | | |
|---|---|---|---|
| CN | 202052455 U * | 11/2011 | ............ F25B 27/02 |
| WO | WO 2007016271 A2 | 2/2007 | |
| WO | WO 2008009049 A1 | 1/2008 | |
| WO | WO 2009148715 A1 | 12/2009 | |
| WO | WO 2010006826 A1 | 1/2010 | |

OTHER PUBLICATIONS

Sun, Zequan et al; "Thermal energy utilization and energy conservation engineering"; p. 112; Chongqing University press; 1990; CN; Jul. 31, 1990.

* cited by examiner

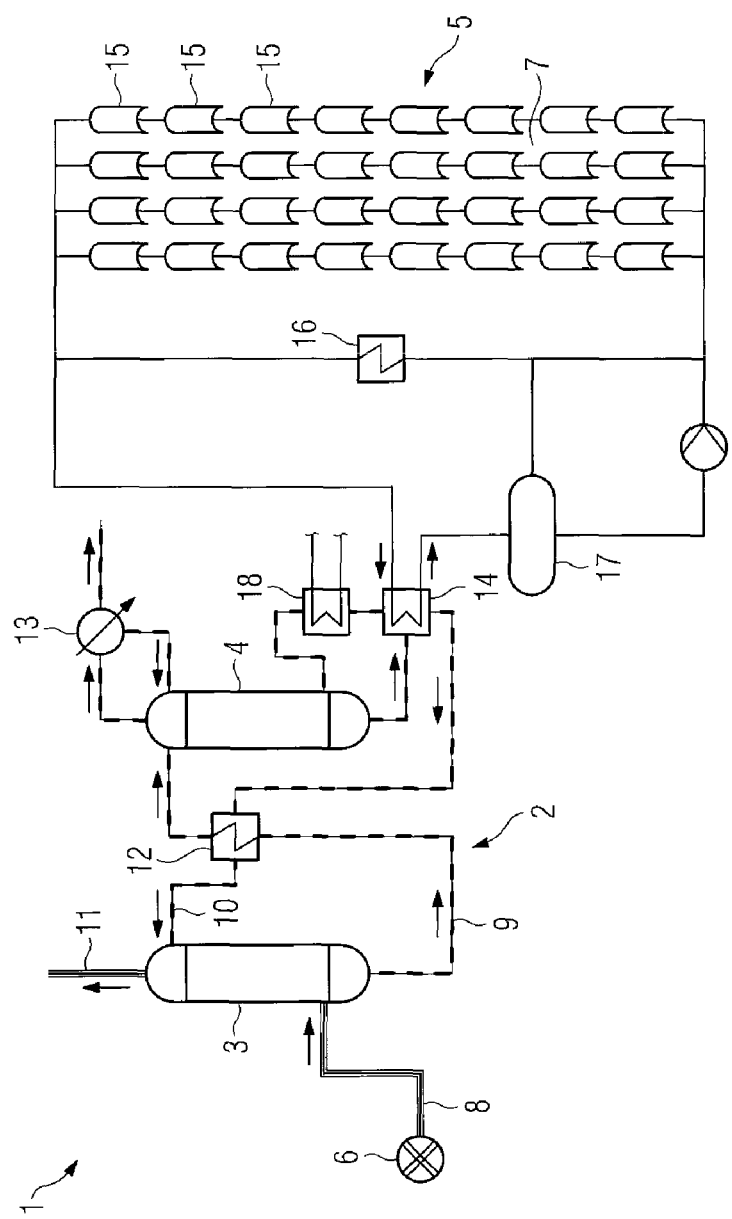

FOSSIL FUEL-FIRED POWER STATION HAVING A REMOVAL APPARATUS FOR CARBON DIOXIDE AND PROCESS FOR SEPARATING CARBON DIOXIDE FROM AN OFFGAS FROM A FOSSIL FUEL-FIRED POWER STATION

CROSS REFERENCE TO RELATED APPLICATIONS

This application is the US National Stage of International Application No. PCT/EP2011/064562, filed Aug. 24, 2011 and claims the benefit thereof. The International Application claims the benefits of European Patent Office application No. 10175226.9 EP filed Sep. 3, 2010. All of the applications are incorporated by reference herein in their entirety.

FIELD OF INVENTION

The invention relates to a fossil-fired power plant having a combustion device and a separation device for carbon dioxide, in particular a separation device for carbon dioxide which is composed of an absorption unit and of a desorption unit. The invention relates, moreover, to a method for separating carbon dioxide from an exhaust gas of a fossil-fired power plant.

BACKGROUND OF INVENTION

In fossil-fired power plants, a series of methods for separating carbon dioxide from the exhaust gas of the power plant are currently being developed and tested. In this case, scrubbing methods are employed, in which carbon dioxide is separated from the exhaust gas by chemical or physical absorption prior to combustion (precombustion) or after combustion (post combustion). In the post-combustion method, carbon dioxide is absorbed in absorption columns by a scrubbing agent which is regenerated again in a desorption column following the absorption column, thereby releasing carbon dioxide. The regenerated scrubbing agent is subsequently conducted from the desorption column via corresponding countercurrent heat exchangers back to the absorption column again and is thus circulated. For the desorption process, a large quantity of heat energy is required for regenerating the scrubbing agent and is supplied to the desorption column via sump evaporators and via heat exchangers in side vents of the desorption column.

The main problem in the existing methods for separating carbon dioxide from an exhaust gas is, in particular, the very high energy outlay which is required in the form of heating energy for desorption. No useful improvements have hitherto been found in this regard in the prior art which sufficiently reduce the energy outlay of a separation device for separating carbon dioxide which is integrated into a power station process.

The necessary heat energy has hitherto been extracted in the form of heating steam from the power station process. In fossil power station processes, at the present time a large part of the low-pressure steam of the steam turbine, usually between 30 and 70%, is used for regenerating the scrubbing agent, thereby reducing the overall efficiency of the power plant by 4 to 7%. Moreover, if an existing power plant is appropriately retrofitted with a carbon dioxide separation device, this results in considerable conversion work on the steam and water circuits and on the steam turbines and consequently in considerable investment.

The general disadvantage of carbon dioxide separation devices which are known from the prior art is, in particular, the very high energy outlay. Furthermore, the diversion of steam from the power plant entails considerable additional investment and makes it difficult to operate the power plant in the various operating states. A further disadvantage arises particularly in the run-up phase of the power plant. The process steam for regenerating the scrubbing agent can be made available only when the power plant generates sufficient process steam. It therefore takes a longer time to transfer the separation plant into a stable separating operation, and, consequently, more carbon dioxide is discharged, unpurified, into the atmosphere.

SUMMARY OF INVENTION

An object of the invention is, therefore, to propose a fossil-fired power plant which, in spite of a connected carbon dioxide separation device, achieves high efficiency, and in which, in the various operating states, the separation plant can be transferred more quickly into a stable separating operation, even when sufficient process steam is not yet available. Carbon dioxide emissions are consequently additionally prevented. A further object of the invention is to specify a method for separating carbon dioxide from an exhaust gas of a fossil-fired power plant, which ensures high efficiency, and in which, in the various operating states, the separation plant can be transferred more quickly into a stable separating operation, in order thereby additionally to prevent carbon dioxide emissions.

The object directed at a device is achieved, according to the invention, by means of the features of the claims.

A fossil-fired power plant having a separation device for carbon dioxide which follows a combustion device and through which a carbon dioxide-containing exhaust gas is capable of flowing, the separation device having an absorption unit and a desorption unit, and, for the provision of desorption energy, the desorption unit being connected to a renewable energy source for an infeed of heat energy, is developed to the effect that a heat accumulator is connected between the desorption unit and the renewable energy source, and one or more absorbent accumulators are integrated into the scrubbing agent circuit of the separation device.

The invention is in this case based on the idea of providing the heat energy required for the separation device via an unconventional renewable energy source instead of via the power plant. This is possible because, in order to regenerate carbon dioxide, only low-temperature heat is required, which can ideally be provided by regenerative energy sources. It is therefore possible to operate the fossil-fired power plant for the generation of current without any appreciable efficiency losses. In the separate operation of a fossil-fired power plant having a separation device and the provision of the necessary heat energy for regenerating the scrubbing agent via renewable energy sources, a more advantageous carbon dioxide balance is obtained in total. It is in this case advantageous particularly that the power plant can convert a fossil fuel at the highest technical efficiency level without any appreciable efficiency losses. Moreover, the separation plant reaches a stable operating mode more quickly in the various load states.

The heat accumulator is in this case configured in such a way that possible excess heat energy which, for example, occurs throughout the day can be intermediately stored, so that the separation device for carbon dioxide can be supplied with heat energy even when the renewable energy source temporarily cannot partially or completely make any heat energy available. This is the case in solar thermal plants outside the solar radiation time. The heat accumulator thus ensures that the separation device for carbon dioxide can be operated to a considerable extent with constant heat energy.

Accumulator units (storage tanks) can likewise be incorporated into the scrubbing agent circuit for the laden and the regenerated scrubbing agent, in order to react more flexibly to load changes and to bridge (not illustrated here) operating states in which sufficient heat energy for desorption cannot be provided.

The absorbent accumulators are containers which can temporarily store absorbent. Advantageously, these containers are arranged in the absorbent line from the absorption unit to the desorption unit, since absorbent laden as a result can be intermediately stored. Operating states in which sufficient heat energy for desorption is not available can thereby be bridged.

By virtue of a separation device which is operated with renewable energies and is integrated in a power plant, markedly lower operating costs are to be expected. In this case, the amount of investment in generating the renewable energy is approximately the same as in the provision of process steam via the fossil-fired power plant.

The renewable energy is advantageously provided by a solar thermal plant. The solar thermal plant is in this case preferably composed of a solar array, composed of individual parabolic trough collectors, or else may be configured in the form of a solar tower plant. By means of the solar array, steam is generated which is provided in the form of heat energy to the desorption unit for the regeneration of scrubbing agent.

A geothermal plant may likewise advantageously be used for generating heat energy for the separation device. A geothermal plant can in this case be employed even in regions where there is possibly insufficient solar radiation for a solar thermal plant, although geothermal heat can be obtained from the soil. The advantage of a geothermal plant is also, in particular, the uninterrupted availability of heat.

In another advantageous refinement of the fossil-fired power plant, the renewable energy source is a biogas and/or biomass combustion plant. Such biogas or biomass combustion plants are counted as renewable energy sources. The use of biogas or biomass combustion plants for generating heat for the separation device may be envisaged at locations of power plants where the use of solar thermal plants or geothermal plants is unfavorable in energy terms because of the geological situation.

In a further preferred refinement, the desorption unit can obtain heat energy from the steam turbine unit of the fossil-fired power plant via a further following or parallel-connected heat exchanger, so that, in the case of an insufficient supply of heat energy by the renewable energy source, heat energy from the steam turbine unit can be administered to the desorption unit. Appropriate regulating devices are provided for controlling the supply of heat. This measure therefore ensures that, even in the case of a complete or partial undersupply of heat energy via the renewable energy source, heat energy in the form of process steam from the power station process can be used for the desorption of carbon dioxide. The operating reliability of the separation device for carbon dioxide is thus increased.

The object of the invention which is directed at a method is achieved by means of a method having the features of the claims.

The method for separating carbon dioxide from an exhaust gas of a fossil-fired power plant, composed of an absorption process and of a desorption process, provides the heat energy required for the desorption process at least partially by means of renewable energies, the renewably generated heat energy being intermediately stored before being fed into the desorption process, and a complete or partial undersupply of renewable heat energy to the desorption process being compensated by means of a regulating process in which the undersupply is made up by steam from the steam turbine process of the fossil-fired power plant.

According to the invention, in this case, the energy required for separating carbon dioxide is provided by renewable energies instead of from the fossil-fired power plant. This is possible because heat at a relatively low level is sufficient for regenerating the carbon dioxide solvent. This heat can ideally be provided by regenerative energy sources. As a result, the fossil-fired power plant can be operated and generate current without any appreciable efficiency losses.

Moreover, the separation plant is transferred into a stable separating operation more quickly in the various operating states, even when sufficient process steam is not yet available, and therefore, in addition, carbon dioxide emissions are prevented.

In an advantageous refinement of the method for separating carbon dioxide, the heat energy for the desorption process is generated solar-thermally and is transmitted to a heat exchanger medium.

In a further advantageous refinement of the method for separating carbon dioxide, the heat for the desorption process is generated geothermally and is transmitted to a heat exchanger medium. The use of geothermy has the advantage, as compared with solar thermy, that the heat energy is available largely constantly.

The method for separating carbon dioxide is also refined advantageously in that the heat energy for the desorption process is generated by the combustion of biogas and/or biomass, and the heat energy is transmitted to a heat exchanger medium. The combination of a plurality of regenerative energy sources of different types is also possible. Thus, for example, geothermal supply and/or supply as a result of the combustion of biogas and/or biomass are/is provided for covering the basic demand, and a solar thermal plant is additionally provided for covering peaks in demand.

BRIEF DESCRIPTION OF THE DRAWINGS

The invention is explained in more detail below, with reference to an exemplary embodiment, by means of a diagrammatic drawing in which:

FIG. 1 shows an exemplary embodiment of a fossil-fired power plant having a separation device for carbon dioxide which is connected to a solar thermal plant.

DETAILED DESCRIPTION OF INVENTION

The fossil-fired power plant 1 illustrated in FIG. 1 is composed essentially of a combustion device 6, of a separation device for carbon dioxide 2 and of a renewable energy source 5. In the exemplary embodiment of FIG. 1, the renewable energy source 5 is a solar array 7.

The separation device 2 for carbon dioxide 2 comprises essentially an absorption unit 3 and a desorption unit 4. The absorption unit 3 and the desorption unit 4 may be composed of one or more columns. The combustion device 6 is connected to the absorption unit 3 via a flue gas line 8. The flue gas is in this case fed in the lower region of the absorption unit 3. Inside the absorption unit 3, the flue gas is brought into contact with a solvent, carbon dioxide being taken up by the solvent. A flue gas which is largely free of carbon dioxide leaves the absorption unit and is discharged from the absorption unit 3 through the flue gas outlet 11.

For the discharge of laden solvent, the absorption unit 3 is connected to the desorption unit 4 by means of a solvent feed line 9. The laden solvent is discharged at the bottom of the absorption unit 3. Connected preferably in the upper region of the absorption unit 3 is a solvent-recirculation line 10 by means of which the absorption unit 3 is connected to the desorption unit 4 for the recirculation of regenerated solvent. A countercurrent heat exchanger 12 is connected into the solvent feed line 9 and the solvent-recirculation line 10. Heat is transmitted from the regenerated solvent to the laden solvent by the countercurrent heat exchanger 12. This, on the one hand, assists the desorption process, since the laden solvent is already preheated and less energy then has to be expended in order to expel the carbon dioxide, and, on the other hand, assists the absorption process, since the cooled regenerated solvent makes it possible to have a higher load of carbon dioxide.

In the desorption unit 4, the laden solvent is heated further, carbon dioxide being released as a result of what is known as decoction. A vapor, a gas/steam mixture of carbon dioxide and steam, leaves the desorption unit 4 in the upper region. Carbon dioxide is separated by the condensation of the steam in a condenser 13 following the desorption unit 4.

In the exemplary embodiment of the invention shown in FIG. 1, the desorption unit 4 is heated by a sump evaporator 14. The sump evaporator 14 is a heat exchanger which transmits heat from a heat source on its primary side to the laden solvent on its secondary side. On the primary side, the sump evaporator 14 is connected to solar array 5. Other regenerative energy sources, such as a geothermal plant or a biogas and/or biomass combustion plant, are not illustrated here. Additional heating of the desorption unit 4 by a side evaporator is not shown here.

The solar array 5 comprises a number of solar collectors 15, for example parabolic troughs, a heat accumulator 16 connected in parallel to the solar collectors 15, and a pressurized container 17. The number of solar collectors 15 must be dimensioned on the basis of the existing average solar radiation and required heat capacity of the desorption unit 4. The heat accumulator 16 serves for the intermediate storage of heat energy. If the separation device 2 is not in operation or is only partially in operation, excess heat energy is stored by the heat accumulator 16. By means of corresponding valves and controls, which are not illustrated in any more detail here, it is possible, depending on the operating situation, to route a heat exchanger medium circulating in the solar array 5 either only through the solar collectors 15 and the heat accumulator 16 or through the solar collectors 15 and completely or partially through the desorption unit 4. Pumps required or devices necessary for the renewable energy source 5 are also not illustrated.

Accumulator units may likewise be incorporated into the scrubbing agent circuit for the laden and the regenerated scrubbing agent, in order to react more flexibly to load changes and to bridge operating states in which sufficient heat energy for desorption cannot be provided. Such accumulator units are not illustrated in FIG. 1.

For the operating situation where the separation device 2 requires more heat energy than the renewable energy source 5 can provide, an additional heat exchanger 18 in the form of a sump evaporator is provided, via which additional heating steam from the power plant can be introduced into the desorption unit 4, so that the desorption unit 4 can be operated at an optimal heating point. The heat exchanger 18 follows the sump evaporator 14 in FIG. 1. Alternatively, a parallel connection can also be envisaged, although this is not shown here. By means of the heat exchanger 18, exclusive heating of the desorption unit 4 by process steam from the power station process is also possible in a special case. A regulating device, not illustrated here, is provided for the optimal supply of the desorption unit 4 with heat energy either from the renewable energy source 5 or from the power plant or in combination with one another.

The invention claimed is:

1. A fossil-fired power plant, comprising:
   a separation device for carbon dioxide which follows a combustion device and through which a carbon dioxide-containing exhaust gas is capable of flowing, the separation device, comprising:
      an absorption unit, and
      a desorption unit;
   a renewable energy source; and
   a heat accumulator,
   wherein the desorption unit is connected to the renewable energy source,
   wherein the heat accumulator is connected between the desorption unit and the renewable energy source,
   wherein a plurality of absorbent accumulators are connected into a scrubbing agent circuit of the separation device for carbon dioxide, and
   wherein the desorption unit is connected to a heat exchanger that introduces heat energy from steam generated from the fossil-fired power plant into the desorption unit so as to compensate for an event of an insufficient supply of heat energy by the renewable energy source to the desorption unit.

2. The fossil-fired power plant as claimed in claim 1, wherein the renewable energy source is a solar thermal plant and comprises a solar array.

3. The fossil-fired power plant as claimed in claim 1, wherein the renewable energy source is a geothermal plant.

4. The fossil-fired power plant as claimed in claim 1, wherein the renewable energy source is a biogas and/or biomass combustion plant.

5. A method for separating carbon dioxide from an exhaust gas of a fossil-fired power plant, comprising:
   providing an absorption process and a desorption process, in which heat energy required for the desorption process is generated by renewable energies;
   storing intermediately the renewably generated heat energy before being provided in the desorption process; and
   compensating a complete or partial undersupply of renewable heat energy to the desorption process by causing the undersupply to be made up by steam from a steam turbine process of the fossil-fired power plant.

6. The method as claimed in claim 5, wherein the heat energy for the desorption process is generated solar-thermally.

7. The method as claimed in claim 5, wherein the heat energy for the desorption process is generated geothermally.

8. The method as claimed in claim 5, in wherein the heat energy for the desorption process is generated as a result of the combustion of biogas and/or biomass.

* * * * *